United States Patent
Rebollo Pimentel et al.

(10) Patent No.: US 12,499,953 B2
(45) Date of Patent: Dec. 16, 2025

(54) WIPE-OUT AND VERIFICATION OF A NON-VOLATILE MEMORY

(71) Applicant: NXP B.V., Eindhoven (NL)

(72) Inventors: Ivan Jesus Rebollo Pimentel, Graz (AT); Jorge Ernesto Perez Chamorro, Préverenges (CH); Peter Bukovjan, Graz (AT)

(73) Assignee: NXP B.V., Eindhoven (NL)

( * ) Notice: Subject to any disclaimer, the term of this patent is extended or adjusted under 35 U.S.C. 154(b) by 131 days.

(21) Appl. No.: 18/500,150

(22) Filed: Nov. 2, 2023

(65) Prior Publication Data

US 2025/0149099 A1     May 8, 2025

(51) Int. Cl.
    *G11C 16/34*     (2006.01)

(52) U.S. Cl.
    CPC .................. *G11C 16/3445* (2013.01)

(58) Field of Classification Search
    CPC ............ G11C 16/3445; G11C 16/3436; G11C 16/3454; G11C 16/3459; G11C 16/0483; G11C 16/105; G11C 16/22; G11C 29/52; G11C 13/0059; G11C 11/1695; G11C 11/2295; G11C 11/4078; G11C 11/4125; G11C 8/20; G11C 7/005; G11C 5/005
See application file for complete search history.

(56) References Cited

U.S. PATENT DOCUMENTS

| | | | |
|---|---|---|---|
| 7,187,586 B1 | 3/2007 | Wong et al. | |
| 7,295,475 B2 | 11/2007 | Akaogi et al. | |
| 7,342,830 B1 | 3/2008 | Chen et al. | |
| 7,606,080 B2 | 10/2009 | Lee | |
| 9,343,160 B1 | 5/2016 | Dutta et al. | |
| 10,332,599 B2 | 6/2019 | Menezes et al. | |
| 2005/0030793 A1* | 2/2005 | Hsu ................... | G11C 16/0475 |
| | | | 365/185.28 |
| 2009/0296475 A1 | 12/2009 | Hemink et al. | |
| 2022/0020439 A1* | 1/2022 | Stoller .................. | G11C 16/26 |

FOREIGN PATENT DOCUMENTS

| | | |
|---|---|---|
| EP | 2074627 B1 | 9/2010 |
| TW | 201044402 A | 12/2010 |
| TW | I692763 B | 5/2020 |

\* cited by examiner

*Primary Examiner* — Alfredo Bermudez Lozada (57) ABSTRACT

A method is described for performing a wipe-out and verification of a plurality of non-volatile memory (NVM) cells. The method includes performing an operation to set all the plurality of NVM cells to a single state. The single state may be one of a conducing or non-conducting state depending on the NVM architecture. After the operation to set the cells to the single state is complete, the verification is performed. In the verification operation, all cells of the plurality of NVM cells are set to the single state by performing a single read operation on the plurality of NVM cells. Detection of one of a conducting or non-conducting path through the plurality of NVM cells is used to verify if all cells of the NVM array had their contents wiped out. A notification is provided in response to all cells not being set to the single known state.

22 Claims, 5 Drawing Sheets

WIPE-OUT AND VERIFICATION OF A NON-VOLATILE MEMORY

BACKGROUND

Field

This disclosure generally relates to memory, and more particularly, to wipe-out and verification of a non-volatile memory (NVM).

Related Art

Sometimes there is a need to wipe-out or clear all data from a NVM. In general, there are two scenarios when this may be necessary. One scenario involves a use case where it is intended to ensure that an NVM is initialized in a known state, for example, immediately after fabrication or before transitioning to a blank life cycle state. In another use case, all NVM content must be destroyed to avoid leaking or exposing secret or sensitive information to an attacker or unauthorized user. However, some implementations of an NVM are naïve in that there is an expectation that triggering a memory content clean-up or wipe-out operation implies the memory content will be cleared. An attacker may be able to easily find multiple ways to disrupt the correct execution of the wipe-out process.

Therefore, what is needed is a method to ensure memory content is quickly and efficiently wiped out and the wipe-out of the memory content is verified.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method to securely wipe-out the contents of a non-volatile memory (NVM) array. In the array, one or more cells may store a "bit" of information, either a '1' or a '0'. The wipe-out method includes simultaneously selecting all the bits of the NVM array and using a high voltage program or erase operation to change a logic state of all the bits to be either a logic '1' or a logic '0' state. The choice of logic state is arbitrary and may be determined by the NVM architecture, application, or other criteria. From a content destruction/initialization perspective, both program and erase operations correspond to the so called "bulk", "mass" or "all" erase and program operations. Within the context of security, it is critical that the complete memory or at least those words with sensitive data are not able to be accessible for any user. The term "wipe-out" will be used throughout to indicate the memory contents are wiped-out, destroyed, erased, cleared or cleaned-up. The term "cell" refers to a circuit that stores one bit, either a "1" or a "0".

After the wipe-out operation, a verification that the wipe-out operation changed the logic state of all the cells as intended is performed. The array may have one of a parallel architecture or a series architecture. For an array having a parallel architecture that associates all bits of a the different words in parallel, the cell content is wiped out to be non-conductive, which allows groups of cells of the array to be read simultaneously. For example, for a single read operation of a parallel-connected group of cells, if one single cell of the group is conductive, then the read operation would show a conductive result, therefore failing. Likewise, for a series architecture that connects cells of the different words in series, the cells are first set to be conductive, allowing all cells to be read simultaneously. If one single cell would be non-conductive, the read operation would show a non-conductive result, therefore failing.

Performing a NVM wipe-out and verification in this manner potentially reduces the verification time, thus shortening a time opportunity window for an attacker to disrupt the NVM wipe-out operation. Also, the NVM wipe-out using a program or erase operation is non-destructive, allowing re-usability of the product or product analysis.

In accordance with an embodiment, there is provided, method for performing a wipe-out and verification operation of a plurality of non-volatile memory (NVM) cells, the method including: performing an operation to set all cells of the plurality of NVM cells to a single predetermined state; verifying that all cells of the plurality of NVM cells are set to the single predetermined state by performing a single read operation on the plurality of NVM cells, wherein detection of one of a conducting or non-conducting path through the plurality of NVM cells is used to verify if all cells of the NVM array had their contents wiped out; and sending a notification of a verification failure to a verifier device if it is determined that all cells of the plurality of cells were not set to the single known state. The plurality of NVM cells may be part of an NVM array having a parallel architecture, wherein the cells of the plurality of NVM cells are non-conducting when set to the single known state. The plurality of NVM cells may be part of an NVM array having a serial architecture, and wherein the cells of the plurality of NVM cells are conducting when set to the single known state. The operation to set all cells of the plurality of NVM cells to a predetermined state may be a program operation, and wherein the program operation may set the plurality of NVM cells to a non-conducting state. The operation to set all cells of the plurality of NVM cells to a predetermined state may be an erase operation, and wherein the erase operation may set the plurality of NVM cells to a conducting state. The plurality of NVM cells may be connected in parallel, and wherein the single read operation may follow a logical AND function when more than one of the cells of the parallel-connected cells are simultaneously selected. The plurality of NVM cells may be connected in series, and wherein the single read operation may follow a logical OR function when more than one of the cells of the series-connected cells are simultaneously selected. The plurality of NVM cells may be a word having a predetermined number of bits, and wherein the memory may include a plurality of words. The verification failure may result in a system reset of a system comprising the plurality of NVM cells.

In another embodiment, there is provided, a method for performing a wipe-out and verification operation of a non-volatile memory (NVM) array, the method including: performing an operation to set all cells of the NVM array to a single predetermined state; selecting a portion of the NVM array for logic state verification, wherein the portion includes a plurality of NVM cells and the NVM array includes a plurality of portions; applying a current to the portion of the NVM array; determining that all the plurality of NVM cells of the portion were set to the single predetermined state when the current provides a first voltage, and determining that all of the plurality of NVM cells of the portion were not set to the single predetermined state when the current provides a second voltage; repeating the selecting, applying and determining for all portions of the plurality of portions when all of the plurality of NVM cells of the portion were not set to the single predetermined state; and sending a notification of a verification failure to a verifier device when all of the cells of the NVM array have not been set to the single known state. The NVM array may have a parallel architecture, and wherein the cells of the NVM array may be non-conducting when set to the single predetermined state. The NVM array may have a serial architecture, and wherein the cells of the NVM array may be in a conducting state when set to the single predetermined state. The operation to set all cells of the NVM array to a known state may be a program operation, and wherein the program operation may set all the cells of the NVM array to a non-conducting state. The operation to set all cells of the NVM array to a known state may be an erase operation, and wherein the erase operation sets all the cells of the NVM array to a conducting state. The cells of the portion of the NVM array may be connected in parallel, and wherein the single read operation may follow a logical AND function when more than one of the parallel-connected cells are simultaneously selected. The cells of the portion of the NVM array may be connected in series, and wherein the single read operation may follow a logical OR function when more than one of the series-connected cells are simultaneously selected. The portion of the NVM array may be a word having a predetermined number of bits, and wherein the NVM array may include a plurality of words.

In yet another embodiment, there is provided, a non-volatile memory (NVM) including: a plurality of NVM cells; and a control circuit for controlling an operation to set all cells of the plurality of NVM cells to a single predetermined state, the control circuit controlling a verification operation for verifying that all cells of the plurality of cells are set to the single predetermined state by performing a single read operation on the plurality of NVM cells, wherein detection of one of a conducting or non-conducting path through the plurality of NVM cells is used to verify if all cells of the NVM array had their contents wiped out by the operation to set all cells of the plurality of NVM cells to the single predetermined state. The NVM may be embedded in a data processing system. The plurality of NVM cells may have one of a parallel or series architecture.

Figure 1A:
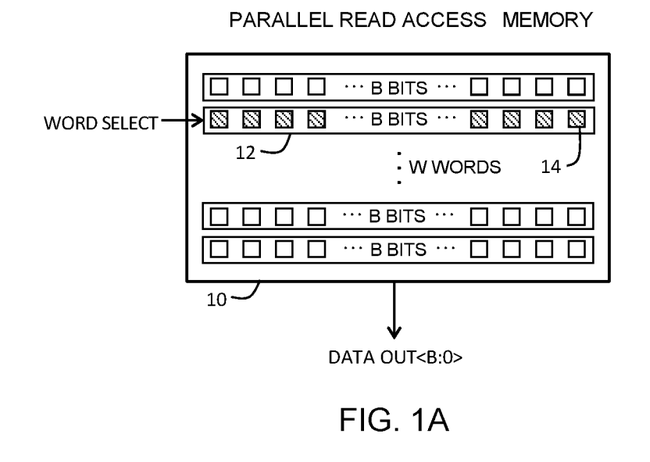
FIG. 1A illustrates, in block diagram form, a parallel read access NVM according to an embodiment.

FIG. 1A illustrates, in block diagram form, NVM 10 having parallel read access operations according to an embodiment. NVM 10 may include a plurality of non-volatile cells organized in words including, e.g., any type of non-volatile memory cells such as multi-time programmable (MTP), electrically erasable read only memory (EEPROM), flash, magnetic random access memory (MRAM), resistive random access memory (RRAM), and other programmable and erasable non-volatile memory cells not listed here. In the same way, a cell may be a "1T-cell" (single transistor access and content), or a "2T-cells" (content transistor and access transistor), or other more complex cells. For example, a 3T cell includes a first transistor for storing the bit, a second transistor for making a word selection, and a third transistor for sector selection.

In one embodiment, one single bit can stored using any number of memory cells. For example, common cell types include a differential cell, a parallel cell, and a series cell. A differential cell is a logic '1' when two cells are provided and a single cell is conductive. A differential cell provides an exclusive OR (XOR) logic operation. A parallel cell includes two cells and provides a logic '1' when both cells are non-conductive. A parallel cell provides an AND logic function. A series cell is a logic '1' when one of the cells are non-conductive and provides a logic OR function.

As an example, NVM 10 may include a plurality of words, where a word 12, includes a predetermined number B of bits 14. Multiple NVM arrays 10 may be included in a memory device. NVM 10 may be organized in a hierarchical manner of groups of cells. For example, a plurality of words 12 may be used to form a sector of words. A plurality of sectors may be used to form, e.g., quadrants or banks of sectors. Note that a naming convention for the groups can be selected arbitrarily. In a different embodiment, different names can be used for the same group of cells. Among the different names that are commonly used are, word, sector, page, block, segment, quadrant, banks, etc. making reference to different hierarchical groups.

A serial read access memory reads a single bit selected within a selected word (and sector). A parallel read access memory reads all bits within a selected word at the same time. In a memory having parallel access operations, all bits of each word have an independent path into and out of the memory array. For example, in a read operation of word 12 of NVM array 10, a word select signal labeled "WORD SELECT" is used to select a word to be read out. All B bits 14 of word 12 are read in parallel out of NVM array 10 via their own separate paths to form a data out word labeled "DATA OUT <B: 0>.

Whether an erase or program operation for a bit generates a logic '0' or a logic '1' is arbitrary for a NVM, and may depend on process, the type of NVM cell, the application, etc. Generally, one operation causes the cell to be more or less "conductive" and the other operation causes the cell to be more or less "non-conductive". It is the read peripheral circuitry, including logic, sense amplifiers, current comparators, output buffers, etc. that decides if the data is shown as either a '0' or a '1'.

In a normal read operation of NVM 10, having all words in parallel, a read operation selects all words one-by-one. Therefore, a read operation of NVM 10 to check the memory content results in the number of read operations equaling the number of words.

In one embodiment, in a read verify operation of NVM 10 that follows a memory wipe-out program or erase operation, if the array has an architecture that connects all cells of the different words in parallel, and the cells are non-conductive when programmed, all of the cells can be read simultaneously in a single read operation. A read operation for verifying the wipe-out operation can be performed on all the cells of the NVM 10 in a one-step operation. If the parallel-connected cells were successfully programmed to be non-conductive by the wipe-out operation, then the read operation will show a non-conductive result, such as for example, a logic '1'. However, if one single cell fails to program and is conducting, indicating, e.g., a logic '0', the read operation would show a conducting result, therefore failing the verification operation.

The amount of benefit provided is based on whether the memory content wipe-out operation results in either conducting or non-conducting cells, and how the memory cell array or matrix has defined its architecture. In one embodiment, all cells can be read simultaneously without the need to loop thru all of them.

Due to potential electrical limitations because of memory size, such as the amount of current draw required for programming or erasing a large array at once, multiple memory wipe-out operations to smaller partitions of the memory array may be used.

Figure 1B:
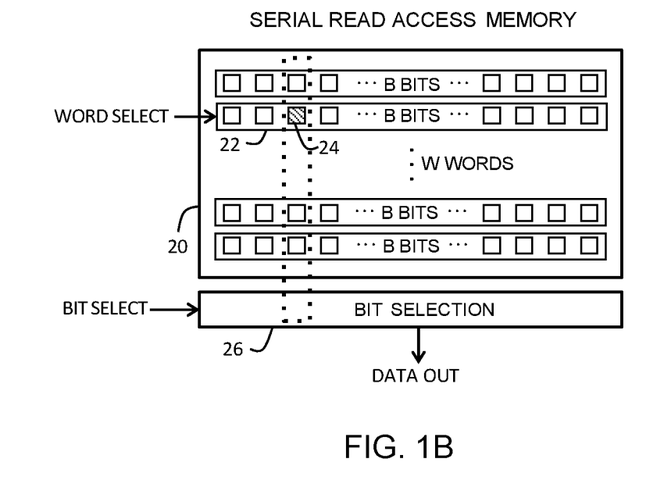
FIG. 1B illustrates, in block diagram form, a serial read access NVM according to an embodiment.

FIG. 1B illustrates, in block diagram form, NVM 20 with serial read access operations according to an embodiment. In a serial read access memory, a single bit is selected within a selected word (and sector) to be accessed. If a word is to be accessed, the word is accessed one bit at time. NVM 20 is similar to NVM 10 in FIG. 1A except that in NVM 20, an access to a word 22 of bits is performed serially. NVM 20 may include a plurality of words, where a word 22 includes a predetermined number B of bits 24. A word can have any number of bits. Multiple NVM arrays 20 may be included in a memory device. In a memory with bits connected in series, each bit is accessed for an operation serially. When a word is accessed, such as word 22, bit selection circuit 26 selects each bit 24 of word 22 serially using bit select signal BIT SELECT to output as output signal DATA OUT to bit selection circuitry 26. Note that a memory module for a data processing system can include any combination of series and parallel architectures and serial and parallel read access operations.

In NVM 20 with an architecture that connects all bits in series, and the cell content when erased is conductive, all the cells can be read simultaneously in one read operation and the read operation will output a logic '0'. If one single cell of the series connection of bits is non-conductive, the read operation would output a non-conductive logic state '1'. In a verify operation of a memory wipe-out program or erase operation, this would indicate that not all of the bits were erased, therefore failing the verification.

Figure 2:
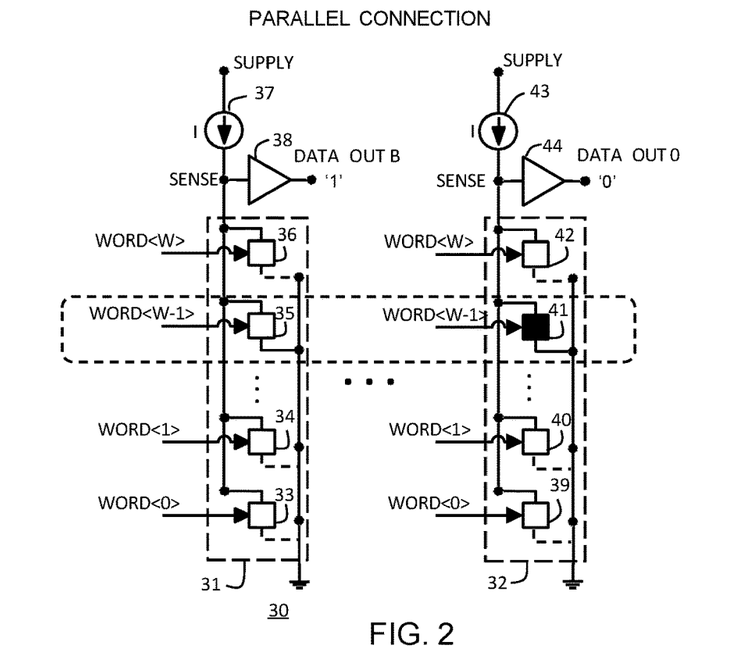
FIG. 2 illustrates a parallel architecture circuit portion of the NVM of FIG. 1A in more detail.

FIG. 2 illustrates a parallel architecture circuit portion 30 of NVM 10 of FIG. 1A in more detail. Parallel circuit portion 30 includes parallel connected cells 31 and parallel connected cells 32. Parallel connected cells 31 includes NVM cells 33-36 connected in parallel between a sense terminal SENSE and ground. A current source 37 is connected between a supply voltage SUPPLY and the sense terminal for providing a current labeled "I". A sense amplifier 38 has an input connected to the sense terminal and an output for providing an output signal labeled "DATA OUT B." A parallel read access has as many sense amplifiers as bits in a word. In that case, the bits of the different words can be associated either in a parallel or series architecture. Parallel connected cells 32 includes NVM cells 39-42 connected in parallel between a sense terminal SENSE and ground. A current source 43 is connected between the supply voltage SUPPLY and the sense terminal for providing a current labeled "I". A sense amplifier 44 has an input connected to the sense terminal and an output for providing an output signal labeled "DATA OUT 0." Each word stored in the NVM is accessed using a word select signal labeled WORD<0> to WORD<W>, where there are W words in the array.

As an example of a normal read operation, a word is accessed by word select signal WORD<W−1> of a word having representative cells 35 and 41 indicated with the dashed box. The operation of the NVM cells is based on current injection (source or sink) into the cell which works as an impedance. Cell 35 is programmed to read a logic '1' and is non-conductive. For purposes of illustration, non-conductive cells are light colored and conductive cells are dark colored. The word select signal causes the cells of the selected word to be coupled to their respective source lines (ground). Unselected cells are shown with a dashed line between the cell and the ground line. Because cell 35 is non-conductive, when connected to ground no current flows to ground and sense amplifier 38 outputs a logic '1' DATA OUT B. On the other hand, cell 41 is programmed to be conductive. When coupled to ground by the asserted word select signal WORD<W−1>, cell 41 will cause the sense terminal to be pulled low and sense amplifier 44 will output a logic '0' DATA OUT 0. In this way, all of the cells of the selected word WORD<W−1> are read out of the NVM at the same time.

As can be seen, the parallel memory structure shown in FIG. 2 requires an individual read path and one sense amplifier per bit, which requires more area on an integrated circuit. However, a parallel memory is faster because all B bits of a word can be read at the same time. It follows then that the parallel memory consumes more peak current than a series memory. The parallel memory does not need to switch B times to read a complete word, which saves current and time. The parallel memory requires a lower voltage supply operation because there is less load per bit which provides for faster switching which may compensate the higher peak current.

Figure 3:
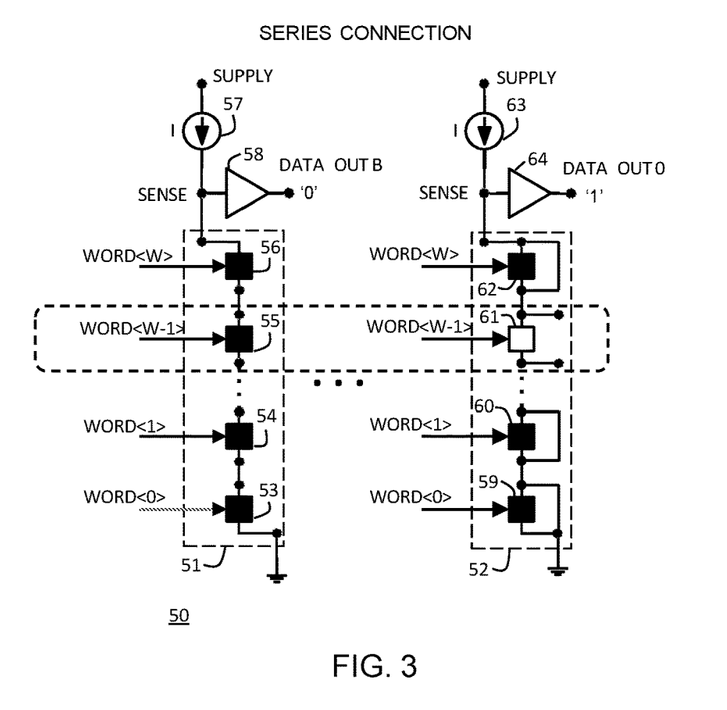
FIG. 3 illustrates a series architecture circuit portion of the NVM of FIG. 1A in more detail.

FIG. 3 illustrates series architecture circuit portion 50 of NVM 20 of FIG. 1A in more detail. Series circuit portion 50 includes series-connected cells 51 and 52. Series-connected cells 51 includes NVM cells 53-56 connected in series between ground and sense terminal SENSE. Current source 57 is connected between supply voltage SUPPLY and the sense terminal for providing current I. Sense amplifier 58 has an input connected to the sense terminal and an output for providing output signal DATA OUT B. Series-connected cells 52 includes NVM cells 59-62 connected in series between ground and sense terminal SENSE. Current source 63 is connected between supply voltage SUPPLY and the sense terminal for providing current I. Sense amplifier 64 has in input connected to the sense terminal and an output for providing output signal DATA OUT 0. Note that in another embodiment, there is only one sense amplifier and each of the series-connected cell groups are connected to the sense amplifier through a bit selection circuit as shown in FIG. 1B. Bit selection circuit may be, e.g., a multiplexer.

As an example normal read operation of NVM portion 50, a word is accessed by word select signal WORD<W−1> of a word having representative cells 55 and 61 indicated with the dashed box. The operation of the NVM cells is based on current injection (source or sink) into the cell which works as an impedance. For purposes of illustration, non-conductive cells are light colored and conductive cells are dark colored. The word select signal WORD<W−1> selects cells of the word to be read including cells 55 and 61. In one embodiment, the bit selection logic (see FIG. 1B) causes each cell of the word to be read one at a time through a single sense amplifier. FIG. 3 illustrates the point in time when cell 61 is being read. Cell 55 is read at a different time. Cell 61 is non-conductive and stores a logic '1'. During a read operation of selected cell 61, the other cells 59, 60, and 62 of series-connected cells 52 are shorted through the read path between the sense terminal SENSE and ground so that the logic state of selected cell 61 can be read. Because selected cell 61 is non-conductive, it disconnects the read path to ground and causes a logic high at the sense terminal, which is sensed and amplified by sense amplifier 64 as DATA OUT 0. Each of the other cells of the selected word are read in the same way until all of the cells of the selected word are read. In this way, all of the cells of the selected word WORD<W−1> are read out of the NVM in a sequence.

Compared to the parallel read access, the serial read access provides for less peak current because the serial read access does not require the simultaneous operation of many sense amplifiers. However, a read operation requires more time and a higher operating voltage because there is a higher load per bit.

Figure 4A:
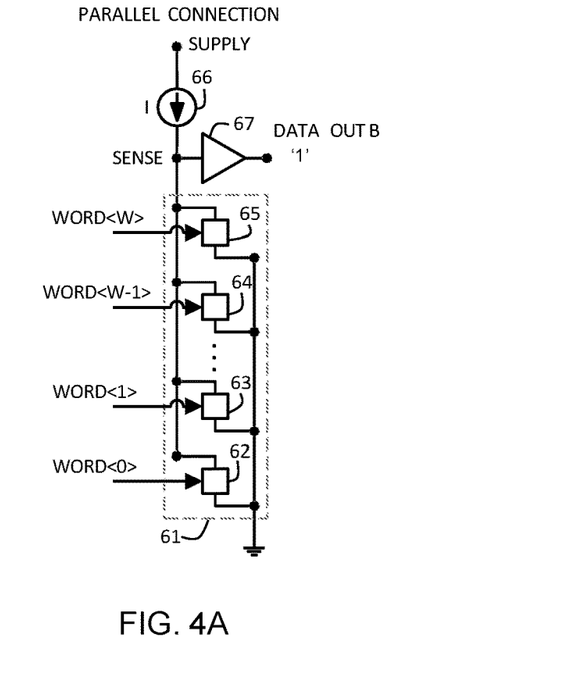
FIG. 4A illustrates a verification read operation of a parallel architecture circuit portion of NVM cells of an NVM array with all bits non-conducting according to an embodiment.

FIG. 4A illustrates a verification read operation of a parallel portion 61 of NVM cells of an NVM array with all bits non-conductive according to an embodiment. Like parallel portion 30 in FIG. 2, parallel portion 61 includes memory cells 62-65 connected in parallel between sense terminal SENSE and ground. Current source 66 provides a current I from the power supply voltage SUPPLY to the sense terminal SENSE. In the array, if all bits of different words are connected in parallel, when selecting several words with the word select signals WORD<0> to WORD<W> at the same time, the data out follows a logical AND function. During a program operation to set the logic state of all cells of the NVM to one logic state for wiping the memory content, a high programming voltage is applied to the array to set all the cells to be non-conductive. If all of the cells are successfully set to be non-conductive by the programming operation, then the output for a read verification operation with all cells 62-65 selected and connected to the ground line will be pulled high toward the power supply voltage SUPPLY, and sense amplifier 67 will provide a logic '1', indicating all of the cells were successfully programmed. However, if a single bit of the selected words fails to program and is conductive, then the data out is a logic '0', indicating at least one of the cells 62-65 failed to correctly program.

Therefore, by selecting all words and sectors of words (if applicable), a single read operation is enough to check that all bits are non-conducting and the programming operation has been verified. This results in a much faster memory wipe-out and verification. However, if not all the bits were successfully programmed, then multiple read operations are required to check which bits are conducting. The number of operations may be as many as the number of words times the number of sectors.

Figure 4B:
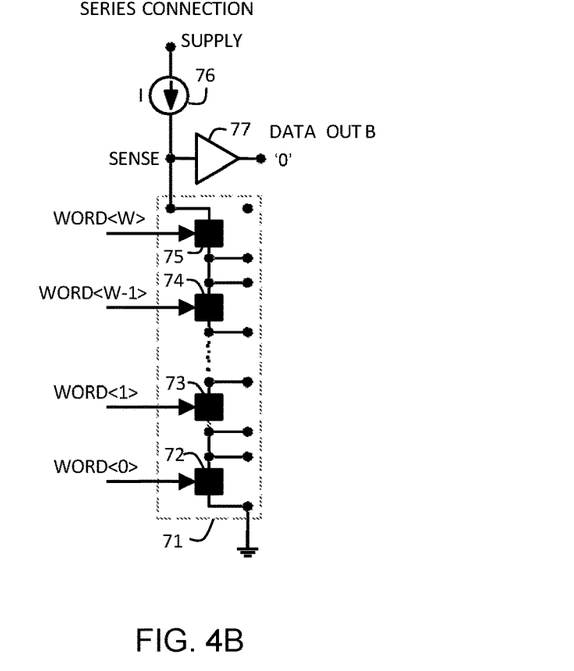
FIG. 4B illustrates a verification read operation of a series architecture circuit portion of an NVM array with all bits conducting according to an embodiment.

FIG. 4B illustrates a verification read operation of a series portion 71 of an NVM array with all bits conducting according to an embodiment. Like series portion 51 in FIG. 3, series portion 71 includes memory cells 72-75 connected in series between sense terminal SENSE and ground. Current source 76 provides current I from the power supply voltage SUPPLY to the sense terminal SENSE. In the array, if all bits of the different words are connected in series, when several words are selected at the same time, the output data follows a logic OR function. During an erase operation to set the logic state of all cells of the series-connected cells of the NVM array to one logic state for wiping out the memory content, a high erase voltage is applied to the array to set all the cells to be conductive. If all of cells 72-75 are successfully set to be conductive by the erase operation, then the output for a read verification operation with all cells 72-75 selected will be pulled low toward ground, and sense amplifier 77 will provide a logic '0', indicating all the cells were successfully erased. However, if a single bit of all the selected words failed to erase, and is non-conductive, then the output data will be a logic '1', indicating at least one of cells 72-75 failed to correctly erase.

As mentioned above, this can result in a much faster memory wipe-out and verification if all the cell contents were successfully wiped out. More time will be required if any of the cells failed to program or erase, as appropriate for the memory architecture.

Figure 5:
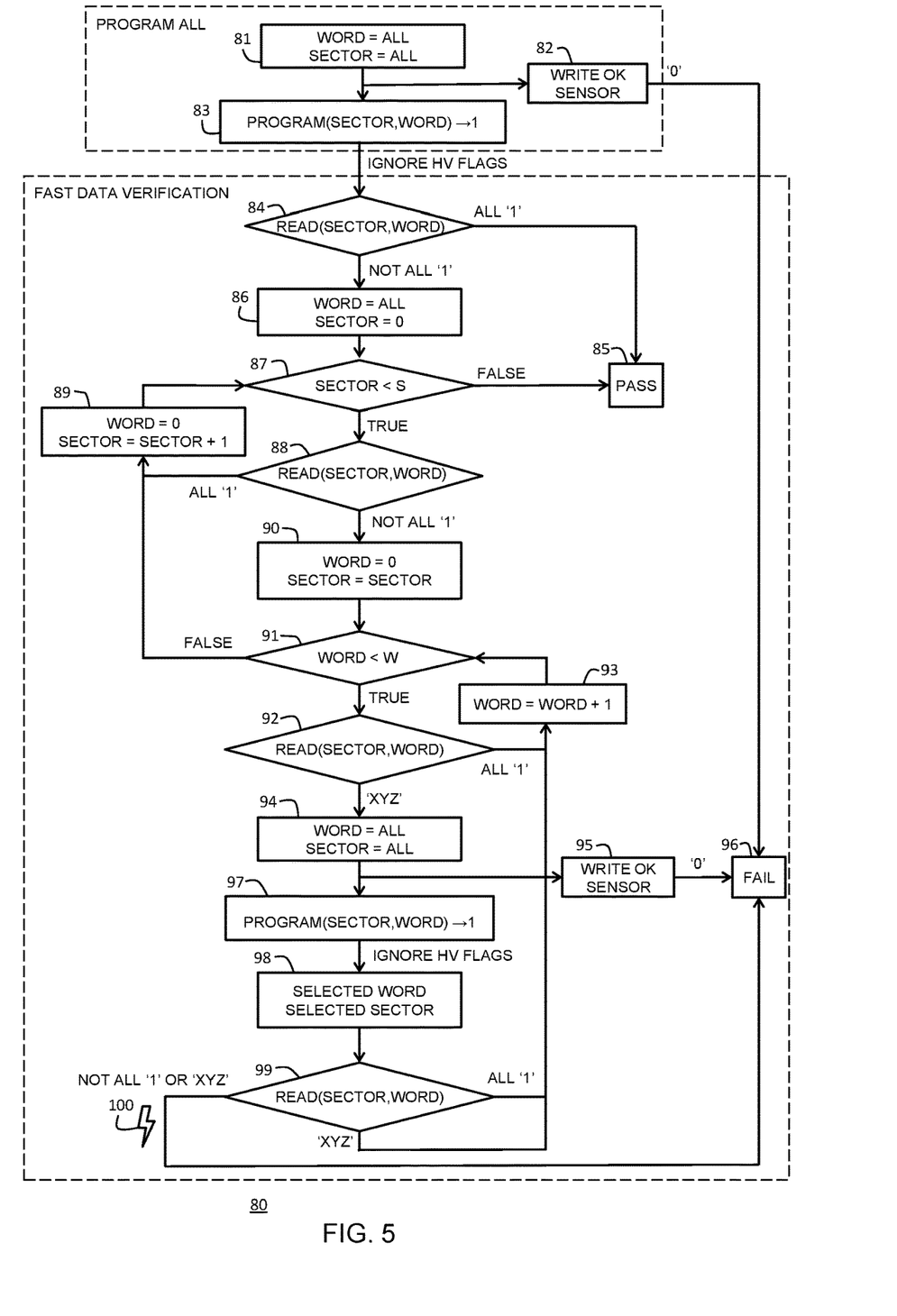
FIG. 5 illustrates a flowchart of a method for NVM wipe-out and verification

FIG. 5 illustrates a flowchart of method 80 for NVM wipe-out and verification using a program operation. For discussion purposes, the program operation is arbitrarily selected to provide a non-conducting state associated with a logic '1' output. Also for discussion purposes, the NVM array includes S sectors, where S can be any number, and each sector includes W words. A word includes any number of bits. The cells for storing the bits are parallel-connected as shown in FIG. 2 and FIG. 4A. As mentioned above, the parallel-connected cells form a logical AND function when several words are selected simultaneously for a read operation, and when all of the cells are programmed to be non-conductive, provide a logic '1' output. The predetermined number of bits may be any number, such as for example. 16, 32, 64, etc. Method 80 begins with a program operation for all bits of the array. In one embodiment, the program operation may be a program operation for memory wipe-out, where a higher than normal program voltage is used. For a memory wipe-out operation, a target high voltage is higher than a normal program voltage. Therefore, high voltage flags are ignored. The higher than normal program voltage requires more time to program the cells than the normal program voltage. The higher than normal program voltage results in a deeper conducting or non-conducting state than required in the normal memory life cycle. This deeper state provides a safer and more secure state. At block 81, all words of all sectors are selected for the program operation. At block 83, the program voltage is applied to the array. At block 82, if a write sensor indicates the program operation failed, then the method fails at block 96. If a higher than normal programming voltage is used, the high voltage (HV) warning flags are ignored.

A data verification operation follows the program operation. At decision block 84, all words of all sectors of the NVM array being wiped-out are selected for one single read verification operation for parallel-connected cells as described and shown above in FIG. 2. If the read operation indicates all the cells were programmed, that is, the output indicates '1', then the method proceeds to block 85 and the memory wipe-out operation passes and operation is allowed to continue. Because only one read operation was required, the wipe-out can be performed and verified very quickly when all the cells were programmed correctly. If however, the output of the read operation is '0', indicating not all the cells were '1' after the program operation, the method proceeds to block 86. At block 86, all words of a first sector, such as sector 0, are selected for a single read operation. At decision block 87, it is checked that the current sector is not the last sector, and the method proceeds to block 88 where the selected sector is read using one single read operation. If the sector read indicates "1', then the method proceeds to block 89, where the sector is incremented and the method returns to block 87. If at block 88, a '0' is output, then the method continues to block 90 and a word of the selected sector is read at block 92. If at block 92, the output is '1', the word is incremented at block 93 and the steps are repeated until all words of all sectors are checked. When an output of a read at block 92 is not '1', as indicated with 'XYZ', at block 97, all the words of all of the sectors are selected for another program operation. If the write OK sensor indicates the program operation failed, the verification fails at step 96. If the verification indicates the wipe-out operation failed, then a notification of the failure may be provided to a user, which may be a verifier device, such as a host processor, or other entity. In one embodiment, a system reset may be performed as a result of the method failing to wipe-out the NVM. Note that any HV warning flags are ignored during the program operation. At block 98, the word and sector previously selected at block 90 is selected for another read operation at block 99. If the program operation was successful, that is, the output was '1', the next word of the selected sector is selected and the method repeats until reaching block 99. However, if at block 99, the read indicates the program operation was not successful, then an attack 100 may be the reason for the program and verification failure and method 80 fails at block 96.

Using method 80 for parallel-connected NVM cells, a memory wipe-out and verification operation can be performed very quickly if there are no failures, because only one read operation of the entire array is necessary. Note that a very large array may require multiple steps, but method 80 may still be performed quickly. Also, the method can be performed quickly if there are fails because only the sectors with detected failures need to be reprogrammed.

Note that, as discussed above, whether a program operation or an erase operation is used can be arbitrarily selected depending on whether a conducting or non-conducting wipe-out state of the NVM is desired. Also, the output logic state can be arbitrarily selected to provide either a logic '1' or a logic '0'. Therefore, one skilled in the art would understand that the method of FIG. 5 can be modified to substitute an "ERASE ALL" operation of all bits in the NVM array to a logic '0', for the "PROGRAM ALL" operation of all bits in the NMV array. Likewise, the data verification portion of the method FIG. 5 would then substitute an erase operation for a program operation of block 97.

Figure 6:
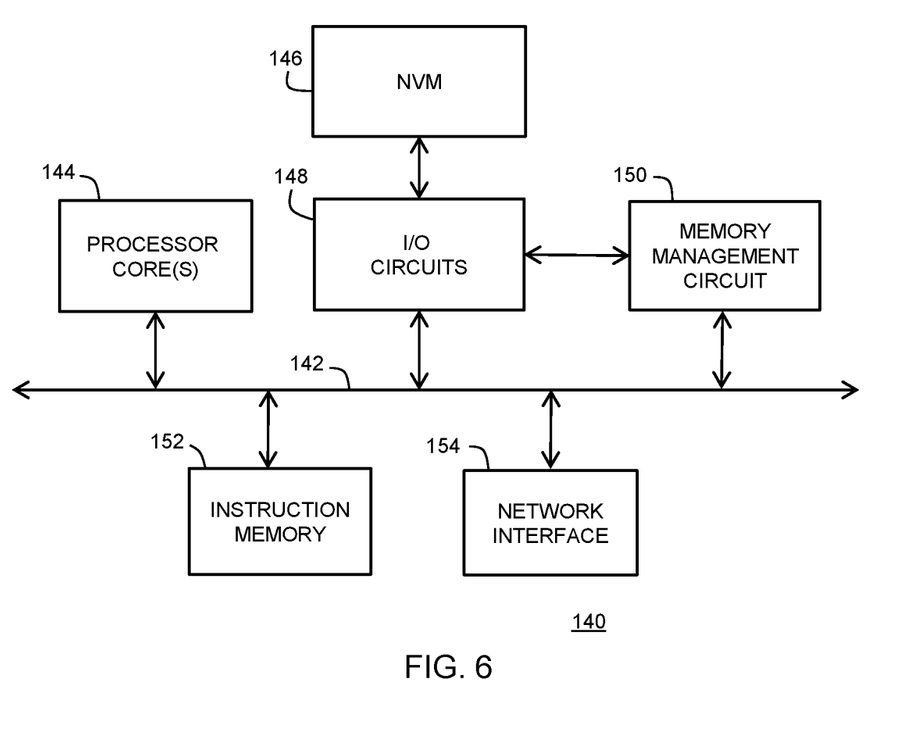
FIG. 6 illustrates a data processing system in accordance with an embodiment.

FIG. 6 illustrates data processing system 140 in accordance with an embodiment. Data processing system 140 may be implemented on one or more integrated circuits and may be used in an implementation of the described embodiments of the memory wipe-out and verification. Data processing system 140 includes bus, or switch network 142. Various modules or circuits may be connected to bus 142. For example, connected to bus 142 are one or more processor cores 144, NVM 146, input/output (I/O) circuits 148, memory management circuit 150, instruction memory 152, and network interface 154. The one or more processor cores 144 may include any hardware device capable of executing instructions stored in NVM 146 or instruction some embodiments, instructions and or data may have to be copied over from NVM 146 to a random access memory (RAM) prior to being provided to processor cores 144. Processor cores 144 may be, for example, a microprocessor, field programmable gate array (FPGA), application-specific integrated circuit (ASIC), or similar device. Processor cores 144 may be implemented in a secure hardware element and may be tamper resistant.

NVM 146 may include an array of any kind of NVM cells such as for example MTP, EEPROM, flash, MRAM, RRAM, and other non-volatile memory cells not listed here. NVM 146 may have cells coupled together in series or in parallel as described herein. Also, NVM 146 may be connected to I/O circuits 148 for accessing memory cells of NVM 146 including word line select, column select, decoders, sense amplifiers and other peripheral circuits needed to access NVM 146. Memory management circuit 150 is coupled to I/O circuit 148 and to bus 142 and controls the program, erase, and read operations of NVM 146. Memory management circuit 150 has control circuitry including hardware, logic, and/or software to control the wipe-out and verification operations according to the described embodiments. Memory management circuit 150 includes high-voltage management of the program and erase wipe-out operation. In one embodiment, NVM 146 is embedded in data processing system 140. In another embodiment, NVM 146 may be separate from data processing system 140.

Instruction memory 152 may include one or more machine-readable non-transient storage media for storing instructions for execution by processor cores 144. In other embodiments, both memories 146 and 152 may store data upon which processor cores 144 may operate. Memories 152 and 154 may be implemented in a secure hardware element and may be tamper resistant.

Network interface 154 may include one or more circuits for enabling communication with other hardware devices. For example, network interface 154 may include, or be coupled to, a network interface card (NIC) configured to communicate according to the Ethernet protocol. Also, network interface 154 may implement a TCP/IP stack for communication according to the TCP/IP protocols. Communication between authenticating device and verifier device may be via network interface 154, or similar interface. Various other hardware or configurations for communicating are available.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for performing a wipe-out and verification operation of a plurality of non-volatile memory (NVM) cells, the method comprising:
performing an operation to set all cells of the plurality of NVM cells to a single predetermined state;
verifying that all cells of the plurality of NVM cells are set to the single predetermined state by performing a single read operation on the plurality of NVM cells, wherein detection of one of a conducting or non-conducting path through the plurality of NVM cells is used to verify if all cells of the NVM array had their contents wiped out; and
sending a notification of a verification failure to a verifier device if it is determined that all cells of the plurality of cells were not set to the single known state,
wherein the plurality of NVM cells are connected in parallel, and wherein the single read operation follows a logical AND function when more than one of the cells of the parallel-connected cells are simultaneously selected.

2. The method of claim 1, wherein the plurality of NVM cells are part of an NVM array having a parallel architecture, wherein the cells of the plurality of NVM cells are non-conducting when set to the single known state.

3. The method of claim 1, wherein the operation to set all cells of the plurality of NVM cells to a predetermined state is a program operation, and wherein the program operation sets the plurality of NVM cells to a non-conducting state.

4. The method of claim 1, wherein the operation to set all cells of the plurality of NVM cells to a predetermined state is an erase operation, and wherein the erase operation sets the plurality of NVM cells to a conducting state.

5. The method of claim 1, wherein the plurality of NVM cells is a word having a predetermined number of bits, and wherein the memory includes a plurality of words.

6. The method of claim 1, wherein the verification failure results in a system reset of a system comprising the plurality of NVM cells.

7. A method for performing a wipe-out and verification operation of a plurality of non-volatile memory (NVM) cells, the method comprising:
performing an operation to set all cells of the plurality of NVM cells to a single predetermined state;
verifying that all cells of the plurality of NVM cells are set to the single predetermined state by performing a single read operation on the plurality of NVM cells, wherein detection of one of a conducting or non-conducting path through the plurality of NVM cells is used to verify if all cells of the NVM array had their contents wiped out; and
sending a notification of a verification failure to a verifier device if it is determined that all cells of the plurality of cells were not set to the single known state,
wherein the plurality of NVM cells are connected in series, and wherein the single read operation follows a logical OR function when more than one of the cells of the series-connected cells are simultaneously selected.

8. The method of claim 7, wherein the plurality of NVM cells are part of an NVM array having a series architecture, and wherein the cells of the plurality of NVM cells are conducting when set to the single known state.

9. The method of claim 7, wherein the operation to set all cells of the plurality of NVM cells to a predetermined state is a program operation, and wherein the program operation sets the plurality of NVM cells to a non-conducting state.

10. The method of claim 7, wherein the operation to set all cells of the plurality of NVM cells to a predetermined state is an erase operation, and wherein the erase operation sets the plurality of NVM cells to a conducting state.

11. The method of claim 7, wherein the plurality of NVM cells is a word having a predetermined number of bits, and wherein the memory includes a plurality of words.

12. The method of claim 7, wherein the verification failure results in a system reset of a system comprising the plurality of NVM cells.

13. A method for performing a wipe-out and verification operation of a non-volatile memory (NVM) array, the method comprising:
performing an operation to set all cells of the NVM array to a single predetermined state;
selecting a portion of the NVM array for logic state verification, wherein the portion includes a plurality of NVM cells and the NVM array includes a plurality of portions;
applying a current to the portion of the NVM array;
determining that all the plurality of NVM cells of the portion were set to the single predetermined state when the current provides a first voltage, and determining that all of the plurality of NVM cells of the portion were not set to the single predetermined state when the current provides a second voltage;
repeating the selecting, applying and determining for all portions of the plurality of portions when all of the plurality of NVM cells of the portion were not set to the single predetermined state; and
sending a notification of a verification failure to a verifier device when all of the cells of the NVM array have not been set to the single known state,
wherein cells of the portion of the NVM array are connected in parallel, and wherein the single read operation follows a logical AND function when more than one of the parallel-connected cells are simultaneously selected.

14. The method of claim 13, wherein the NVM array has a parallel architecture, and wherein the cells of the NVM array are non-conducting when set to the single predetermined state.

15. The method of claim 13, wherein the operation to set all cells of the NVM array to a known state is a program operation, and wherein the program operation sets all the cells of the NVM array to a non-conducting state.

16. The method of claim 13, wherein the operation to set all cells of the NVM array to a known state is an erase operation, and wherein the erase operation sets all the cells of the NVM array to a conducting state.

17. The method of claim 13, wherein the portion of the NVM array is a word having a predetermined number of bits, and wherein the NVM array includes a plurality of words.

18. A method for performing a wipe-out and verification operation of a non-volatile memory (NVM) array, the method comprising:
  performing an operation to set all cells of the NVM array to a single predetermined state;
  selecting a portion of the NVM array for logic state verification, wherein the portion includes a plurality of NVM cells and the NVM array includes a plurality of portions;
  applying a current to the portion of the NVM array;
  determining that all the plurality of NVM cells of the portion were set to the single predetermined state when the current provides a first voltage, and determining that all of the plurality of NVM cells of the portion were not set to the single predetermined state when the current provides a second voltage;
  repeating the selecting, applying and determining for all portions of the plurality of portions when all of the plurality of NVM cells of the portion were not set to the single predetermined state; and
  sending a notification of a verification failure to a verifier device when all of the cells of the NVM array have not been set to the single known state, wherein cells of the portion of the NVM array are connected in series, and wherein the single read operation follows a logical OR function when more than one of the series-connected cells are simultaneously selected.

19. The method of claim 18, wherein the NVM array has a series architecture, and wherein the cells of the NVM array are in a conducting state when set to the single predetermined state.

20. The method of claim 18, wherein the operation to set all cells of the NVM array to a known state is a program operation, and wherein the program operation sets all the cells of the NVM array to a non-conducting state.

21. The method of claim 18, wherein the operation to set all cells of the NVM array to a known state is an erase operation, and wherein the erase operation sets all the cells of the NVM array to a conducting state.

22. The method of claim 18, wherein the portion of the NVM array is a word having a predetermined number of bits, and wherein the NVM array includes a plurality of words.

\* \* \* \* \*